(12) United States Patent
Kadam et al.

(10) Patent No.: US 10,829,023 B2
(45) Date of Patent: Nov. 10, 2020

(54) COLLAPSIBLE GRAB HANDLE

(71) Applicant: Ford Global Technologies, LLC, Dearborn, MI (US)

(72) Inventors: Mangesh Kadam, Canton, MI (US); Srinivas Reddy Malapati, Novi, MI (US); Yuqin Zhao, Troy, MI (US)

(73) Assignee: FORD GLOBAL TECHNOLOGIES, INC., Dearborn, MI (US)

( * ) Notice: Subject to any disclaimer, the term of this patent is extended or adjusted under 35 U.S.C. 154(b) by 110 days.

(21) Appl. No.: 16/383,471

(22) Filed: Apr. 12, 2019

(65) Prior Publication Data
US 2020/0324678 A1 Oct. 15, 2020

(51) Int. Cl.
B60N 3/02 (2006.01)
B60R 13/02 (2006.01)

(52) U.S. Cl.
CPC .............. *B60N 3/023* (2013.01); *B60N 3/026* (2013.01); *B60R 13/025* (2013.01)

(58) Field of Classification Search
CPC .......... B60N 3/02; B60N 3/023; B60N 3/026; B60R 13/025
USPC .................... 296/1.02, 1.08, 193.06
See application file for complete search history.

(56) References Cited

U.S. PATENT DOCUMENTS

| 6,431,643 | B2 | 8/2002 | Grey | |
| 7,631,915 | B2 * | 12/2009 | Browne | B60N 3/023 296/1.02 |
| 7,775,573 | B2 * | 8/2010 | Lipke | B60N 3/026 296/1.02 |
| 7,905,530 | B2 | 3/2011 | Browne et al. | |
| 2011/0221236 | A1 * | 9/2011 | She | B60R 13/025 296/191 |

FOREIGN PATENT DOCUMENTS

| DE | 19747703 A1 | 5/1999 |
| DE | 102013010185 A1 | 12/2013 |
| EP | 0875420 A2 | 11/1998 |
| JP | 2000118284 A | * 4/2000 |
| JP | 2000118284 A | 4/2000 |
| JP | 2005119452 A | * 5/2005 |
| JP | 2005119452 A | 5/2005 |

* cited by examiner

*Primary Examiner* — Jason S Daniels
(74) *Attorney, Agent, or Firm* — Frank A. MacKenzie; Bejin Bieneman PLC

(57) ABSTRACT

A vehicle interior panel assembly includes a trim panel, a grab handle supported by the trim panel and rotatable relative to the trim panel between a retracted position and a grabbable position, a spring biasing the grab handle to the retracted position, and a pyrotechnic actuator fixing the grab handle in the grabbable position and dischargeable to release the grab handle from the grabbable position.

18 Claims, 5 Drawing Sheets

COLLAPSIBLE GRAB HANDLE

BACKGROUND

Some vehicles include grab handles. A grab handle is typically positioned along the edge of a door opening, within reach of a person who is entering or exiting the vehicle. The grab handle can improve the accessibility of the vehicle.

DETAILED DESCRIPTION

Figure 1:
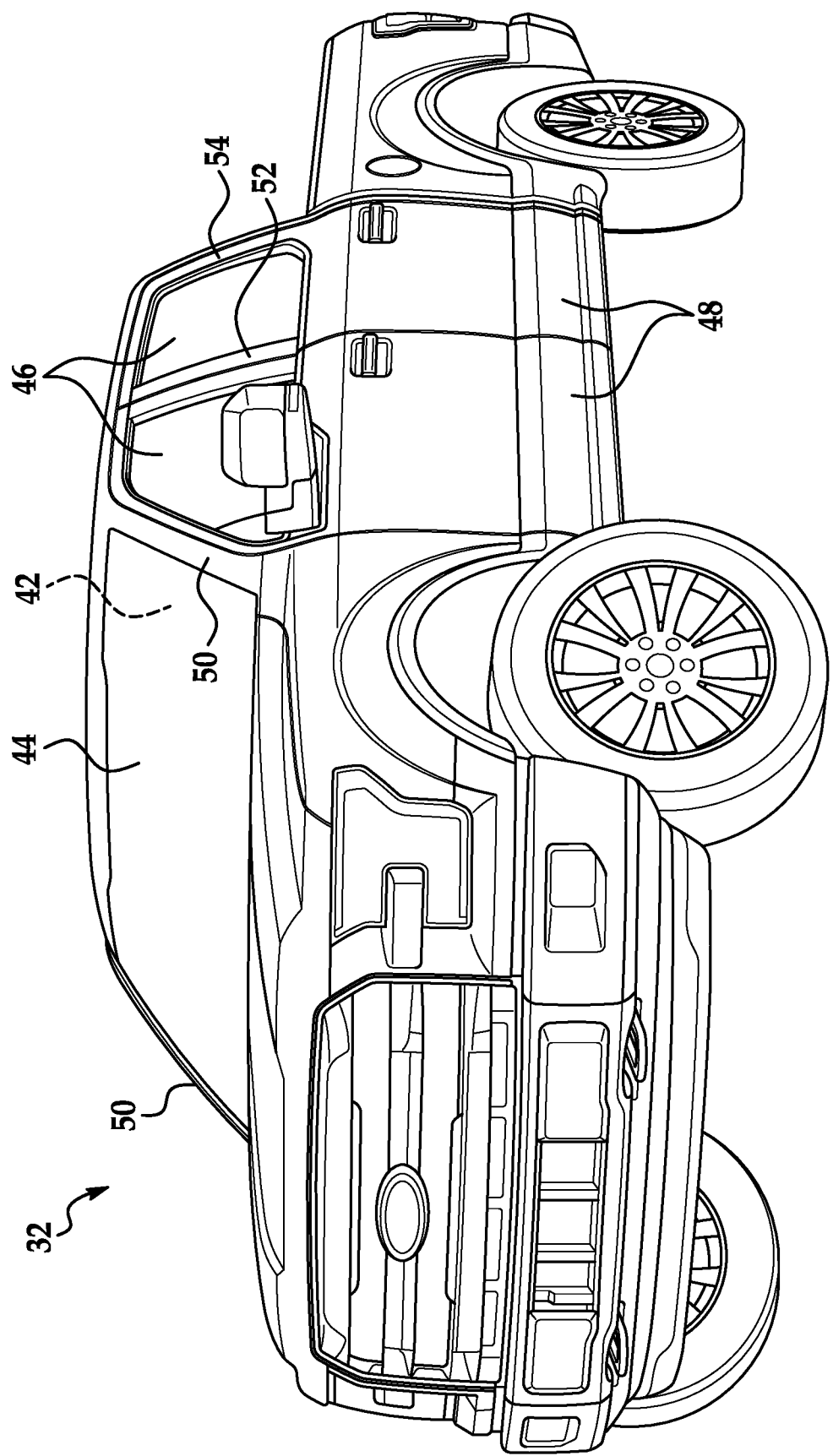
FIG. 1 is a perspective view of a vehicle.

A vehicle interior panel assembly includes a trim panel, a grab handle supported by the trim panel and rotatable relative to the trim panel between a retracted position and a grabbable position, a spring biasing the grab handle to the retracted position, and a pyrotechnic actuator fixing the grab handle in the grabbable position and dischargeable to release the grab handle from the grabbable position.

The pyrotechnic actuator may include a pin that is retractable upon discharging the pyrotechnic actuator. The grab handle may include a hole, and the pin may be retractable from an extended position in the hole to a retracted position spaced from the hole.

The pyrotechnic actuator may include a housing fixed relative to the trim panel, and the pin may be retractable at least partially into the housing.

The vehicle interior panel assembly may further include a first bracket fixed relative to the trim panel, and a second bracket fixed relative to the trim panel, and the grab handle may be coupled to the first bracket with a first revolute joint and to the second bracket with a second revolute joint. The pyrotechnic actuator may be mounted to the first bracket.

The spring may be fixed to the first bracket and to the grab handle.

The vehicle interior panel assembly may further include a peg fixed relative to the grab handle, and a stopper fixed relative to the trim panel, and the rotation of the grab handle relative to the trim panel may define a path along which the peg travels, and the stopper may be positioned to interfere with the peg at a position along the path. The stopper may be positioned to prevent the peg from moving in a direction against the bias of the spring when the grab handle is in the grabbable position.

The stopper may be positioned to prevent the peg from moving in a direction with the bias of the spring when the grab handle is in the retracted position. The stopper may be a first stopper, the vehicle interior panel assembly may further include a second stopper positioned to prevent the peg from moving in a direction against the bias of the spring when the grab handle is in the grabbable position. The first stopper and the second stopper may define a range of motion of the grab handle between the grabbable position and the retracted position, and the range of motion may be less than 180°.

The vehicle interior panel assembly may further include a controller communicatively coupled to the pyrotechnic actuator and programmed to discharge the pyrotechnic actuator in response to data indicating an impact to a vehicle including the vehicle interior panel assembly.

The trim panel may be an A-pillar trim panel. The grab handle may have a midpoint, and the midpoint when the grab handle is in the retracted position may be closer to a windshield.

The grab handle may have a midpoint, and the midpoint when the grab handle is in the retracted position may be farther outboard than the midpoint when the grab handle is in the grabbable position.

The grab handle may include a bar elongated from a first end to a second end, and a foam cover encircling the bar from the first end to the second end.

The spring may be a torsional spring.

With reference to the Figures, a vehicle interior panel assembly 30 for a vehicle 32 includes a trim panel 34, a grab handle 36 supported by the trim panel 34 and rotatable relative to the trim panel 34 between a retracted position and a grabbable position, a spring 38 biasing the grab handle 36 to the retracted position, and a pyrotechnic actuator 40 fixing the grab handle 36 in the grabbable position and dischargeable to release the grab handle 36 from the grabbable position.

In the grabbable position, the grab handle 36 feels sturdy to occupants and is fixed in position (rather than retracting when not being grasped). In the event of an impact to the vehicle 32, the grab handle 36 can retract, reducing a likelihood that an occupant impacts the grab handle 36.

With reference to FIG. 1, the vehicle 32 may be any passenger or commercial automobile such as a car, a truck, a sport utility vehicle, a crossover, a van, a minivan, a taxi, a bus, etc. In particular, as shown in FIG. 1, the vehicle 32 may be a pickup truck.

The vehicle 32 includes a passenger cabin 42 to house occupants, if any, of the vehicle 32. The passenger cabin 42 includes one or more front seats disposed at a front of the passenger cabin 42 and one or more back seats disposed behind the front seats (not shown). The position and orientation of the seats and components thereof may be adjustable by an occupant.

The vehicle 32 includes a windshield 44 and windows 46 through which occupants of the passenger cabin 42 can see an external environment. The windshield 44 faces in a forward direction from the passenger cabin 42, and the windows 46 face laterally from the passenger cabin 42. The windows 46 are mounted in doors 48. The windshield 44 and windows 46 may be formed of any suitably durable transparent material, including glass such as laminated, tempered glass or plastic such as Plexiglas® or polycarbonate.

The vehicle 32 includes A pillars 50, B pillars 52, and C pillars 54. The A pillars 50 extend between the windshield 44 and windows 46. The B pillars 52 extend between the windows 46 of adjacent doors 48. The C pillars 54 extend behind the rearmost windows 46. The vehicle 32 may also include D pillars (not shown) if the vehicle 32 is, e.g., an SUV, crossover, minivan, or station wagon, in which case the C pillars 54 extend between adjacent windows 46, and the D pillars extend behind the rearmost windows 46. The pillars 50, 52, 54 may be, e.g., steel or aluminum.

Figure 2:
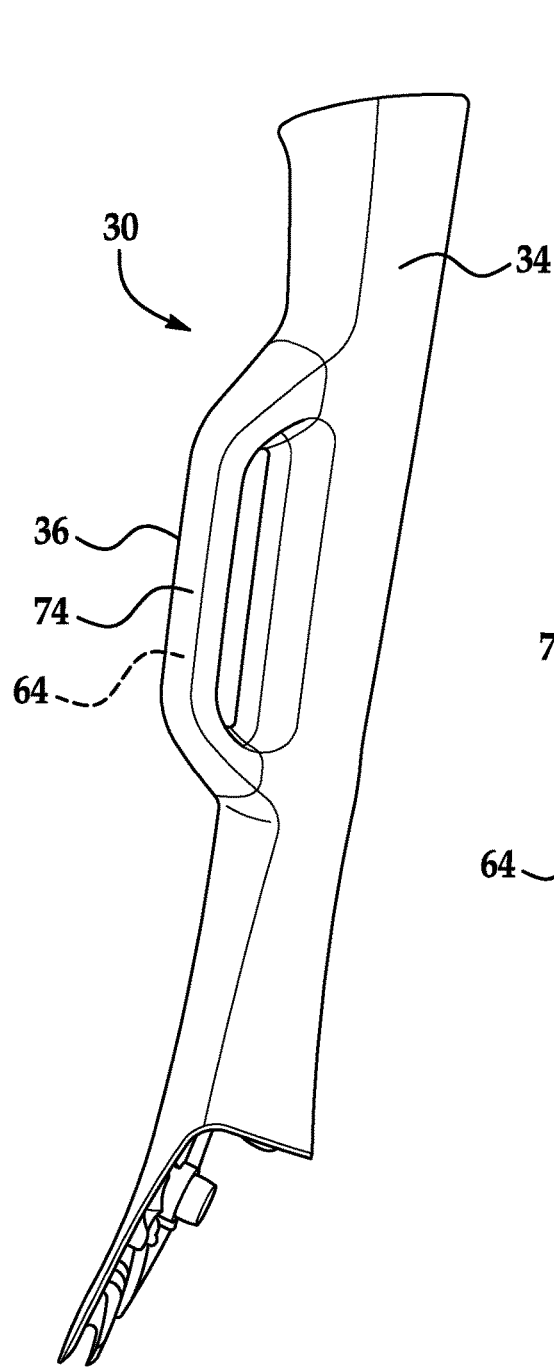
FIG. 2 is a perspective view of an A pillar of the vehicle.

With reference to FIG. 2, the trim panel 34 is mounted to one of the pillars 50, 52, 54. The trim panel 34 has a shape that is contoured to the respective pillar 50, 52, 54. For example, the trim panel 34 can be mounted to and shaped to cover the A pillar 50; i.e., the trim panel 34 is an A-pillar trim panel. The trim panel 34 is a material suitable for an interior of the vehicle 32, e.g., plastic, wood, leather, etc.

Figure 3:
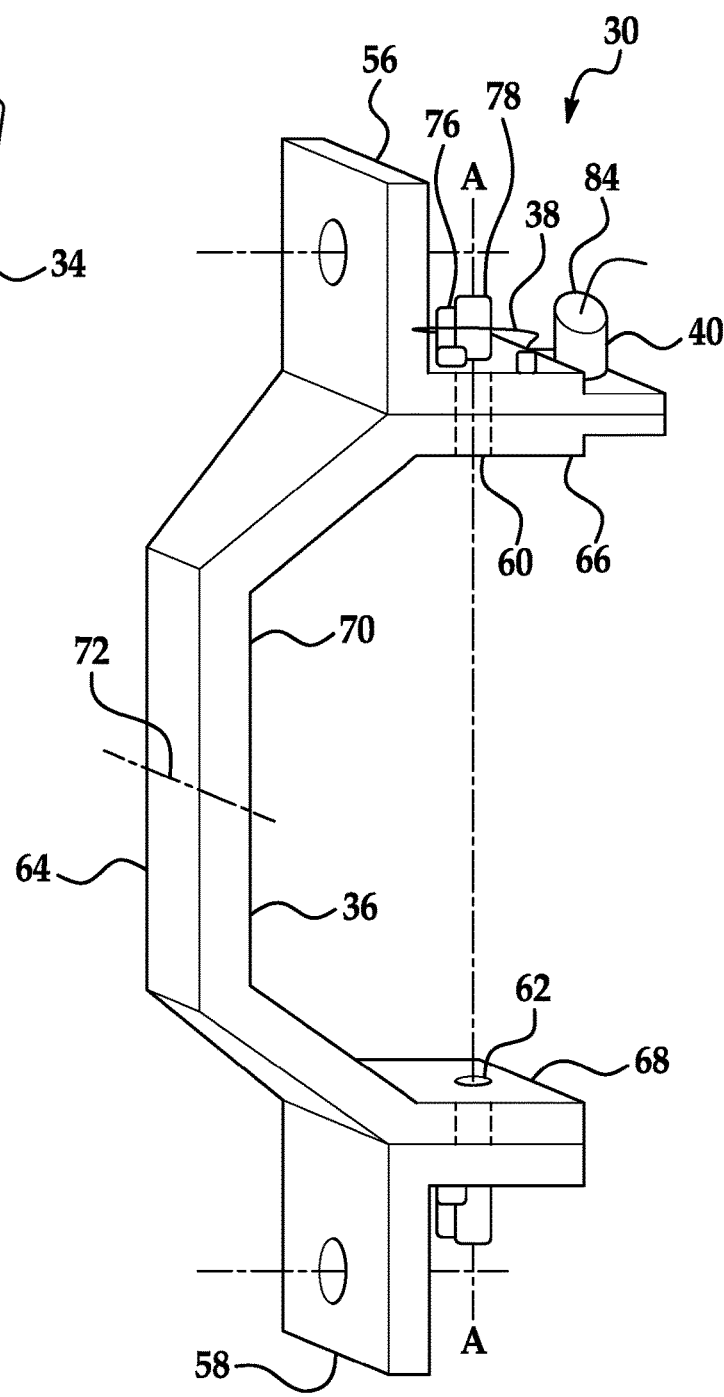
FIG. 3 is a perspective view of a vehicle interior panel assembly of the A pillar.

With reference to FIG. 3, a first bracket 56 and a second bracket 58 are fixed relative to the trim panel 34. For example, the first bracket 56 and second bracket 58 can be welded or fastened to the A pillar 50 to which the trim panel 34 is mounted. The first bracket 56 and second bracket 58 may be, e.g., steel or aluminum.

The grab handle 36 is supported by the trim panel 34, e.g., via the first bracket 56 and second bracket 58. The grab handle 36 is coupled to the first bracket 56 with a first revolute joint 60 and to the second bracket 58 with a second revolute joint 62. The revolute joints 60, 62 each define an axis A, common to both brackets 56, 58, about which the grab handle 36 is rotatable.

The grab handle 36 includes a bar 64 elongated from a first end 66 to a second end 68. The first end 66 is coupled by the first revolute joint 60 to the first bracket 56, and the second end 68 is coupled by the second revolute joint 62 to the second bracket 58. The bar 64 includes a middle portion 70 elongated between the first end 66 and the second end 68. The middle portion 70 is curved between the first end 66 and the second end 68, and the middle portion 70 is spaced from the axis A. The middle portion 70 includes a midpoint 72, i.e., a location on the grab handle 36 halfway between the first revolute joint 60 and the second revolute joint 62. The grab handle 36 can be symmetrical across the midpoint 72. The midpoint 72 can be the location on the grab handle 36 farthest from the axis A. The grab handle 36 includes a foam cover 74 encircling the bar 64 from the first end 66 to the second end 68, as shown in FIG. 2.

Figure 4A:
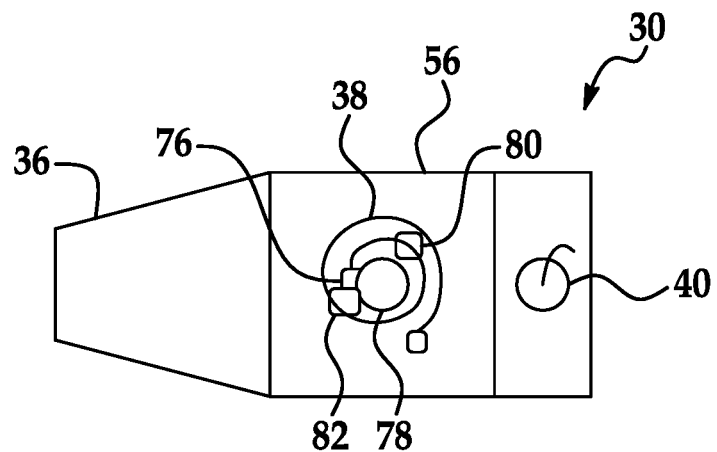
FIG. 4A is a top view of the vehicle interior panel assembly with a grab handle in a grabbable position and a pin of a pyrotechnic actuator in an extended position.
Figure 4B:
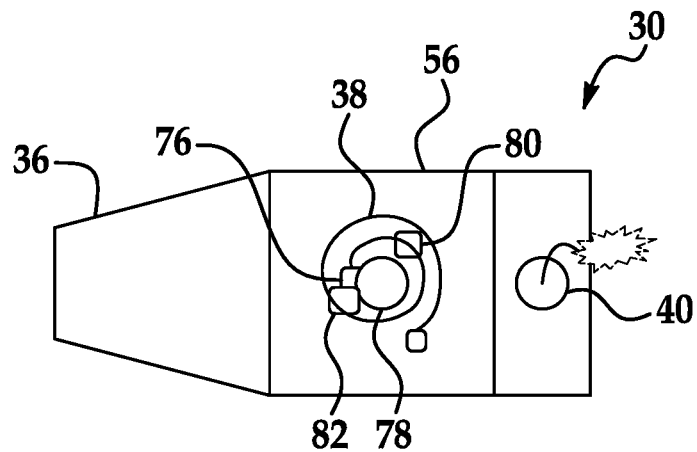
FIG. 4B is a top view of the vehicle interior panel assembly with the grab handle in the grabbable position and the pin of the pyrotechnic actuator in a retracted position.
Figure 4C:
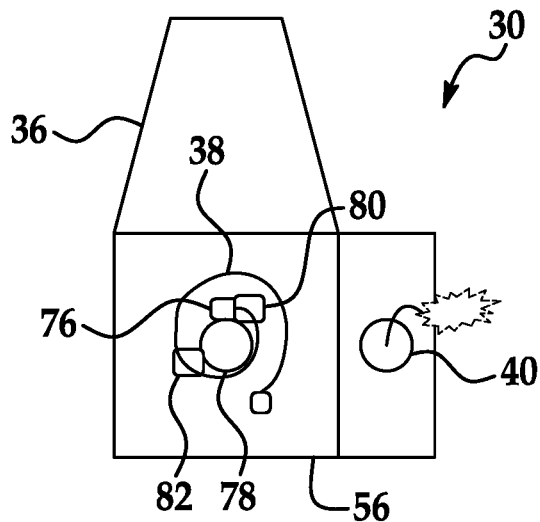
FIG. 4C is a top view of the vehicle interior panel assembly with the grab handle in a retracted position and the pin of the pyrotechnic actuator in the retracted position.
Figure 5C:
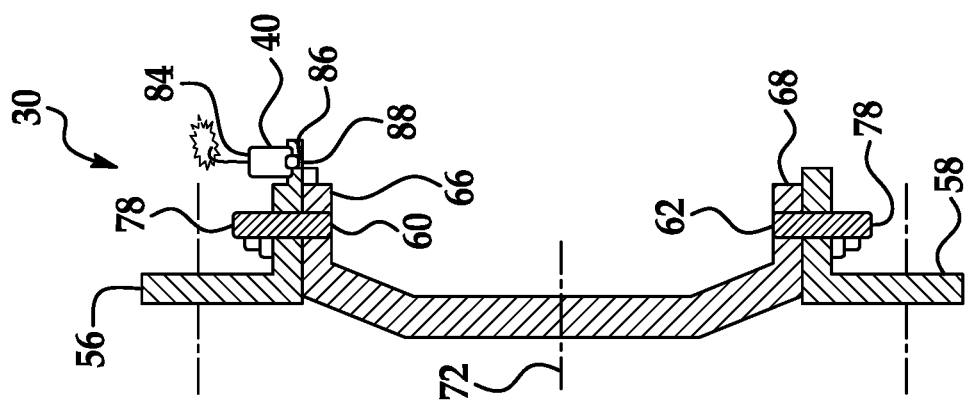
FIG. 5C is a side cross-sectional view of the vehicle interior panel assembly with the grab handle in the retracted position and the pin of the pyrotechnic actuator in the retracted position.

The grab handle 36 is rotatable relative to the trim panel 34 around the axis A between a retracted position, as shown in FIGS. 4C and 5C, and a grabbable position, as shown in FIGS. 4A-B and 5A-B. In the grabbable position, the grab handle 36 is accessible to an occupant entering the passenger cabin 42 or sitting in the seat nearest the grab handle 36. In the retracted position, the grab handle 36 is farther from a head of an occupant sitting in the seat nearest the grab handle 36 than in the grabbable position. The midpoint 72 of the grab handle 36 is closer to the windshield 44 and/or farther outboard when the grab handle 36 is in the retracted position than when the grab handle 36 is in the grabbable position.

With reference to FIGS. 4A-C, a peg 76 is fixed relative to the grab handle 36. For example, as shown in the Figures, the peg 76 extends radially outward from a stem 78 of the grab handle 36 extending through the first revolute joint 60. The peg 76 rotates with the grab handle 36. The rotation of the grab handle 36 relative to the trim panel 34 defines a path along which the peg 76 travels. The path is a semicircle between the position of the peg 76 when the grab handle 36 is in the grabbable position, as shown in FIGS. 4A-B, and the position of the peg 76 when the grab handle 36 is in the retracted position, as shown in FIG. 4C.

The spring 38 is fixed to the first bracket 56 and to the grab handle 36. For example, as shown in the Figures, one end of the spring 38 is fixed to the peg 76, and the other end of the spring 38 is fixed to a point on the first bracket 56 spaced from the axis A. The spring 38 can be a torsional spring. The spring 38 is positioned and attached so as to bias the grab handle 36 from the grabbable position to the retracted position. For example, the spring 38 is in tension when the grab handle 36 is in the grabbable position or is in a position between the grabbable position and the retracted position, and rotating the grab handle 36 toward the retracted position (i.e., clockwise as shown in FIGS. 4A-C) reduces the tension in the spring 38. The spring 38 may also be in tension when the grab handle 36 is in the retracted position, i.e., the spring 38 may bias the grab handle 36 both toward and past the retracted position.

A first stopper 80 is fixed relative to the trim panel 34. For example, as shown in the Figures, the first stopper 80 extends from the first bracket 56 in a direction parallel to the axis A. The first stopper 80 is positioned to interfere with the peg 76 at a position along the path of the peg 76. In particular, the first stopper 80 is positioned to prevent the peg 76 from moving in a direction with the bias of the spring 38 (i.e., clockwise as shown in FIGS. 4A-C) when the grab handle 36 is in the retracted position, as shown in FIG. 4C.

A second stopper 82 is fixed relative to the trim panel 34. For example, as shown in the Figures, the second stopper 82 extends from the first bracket 56 in a direction parallel to the axis A. The second stopper 82 is positioned to interfere with the peg 76 at a position along the path of the peg 76. In particular, the second stopper 82 is positioned to prevent the peg 76 from moving in a direction against the bias of the spring 38 (i.e., counterclockwise as shown in FIGS. 4A-C) when the grab handle 36 is in the grabbable position, as shown in FIGS. 4A-B. The first stopper 80 and the second stopper 82 limit the path of the peg 76 and thereby define a range of motion of the grab handle 36 between the grabbable position and the retracted position. The range of motion of the grab handle 36 is less than 180°.

Figure 5B:
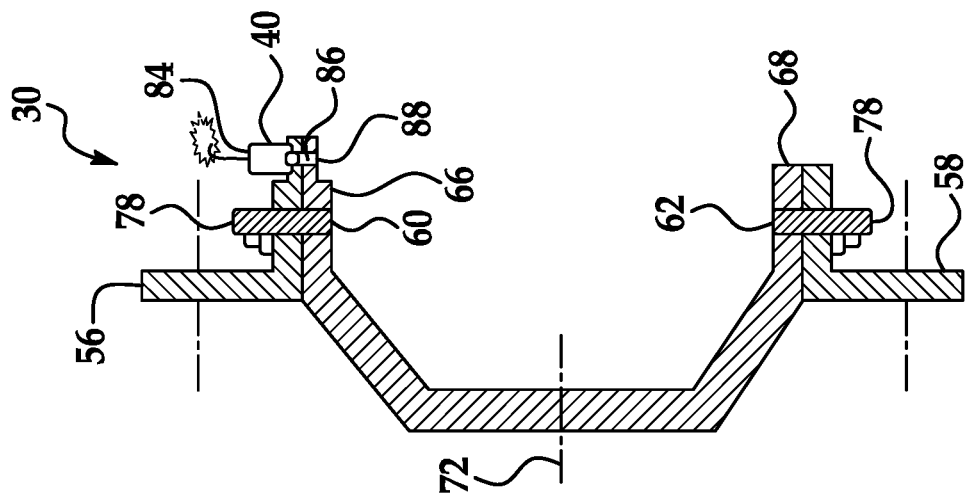
FIG. 5B is a side cross-sectional view of the vehicle interior panel assembly with the grab handle in the grabbable position and the pin of the pyrotechnic actuator in the retracted position.
Figure 5A:
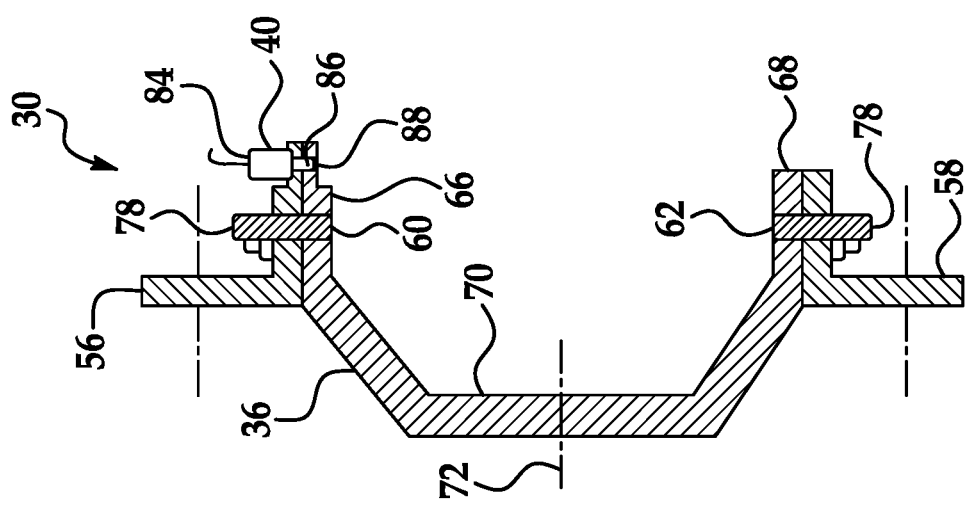
FIG. 5A is a side cross-sectional view of the vehicle interior panel assembly with the grab handle in the grabbable position and the pin of the pyrotechnic actuator in the extended position.

With reference to FIGS. 5A-C, the pyrotechnic actuator 40 includes a housing 84, a pin 86, and a charge (not shown). The pin 86 is linearly movable relative to the housing 84 from an extended position to a retracted position. The pin 86 extends out of the housing 84 in the extended position, as shown in FIG. 5A, and the pin 86 is retracted at least partially into the housing 84 in the retracted position, as shown in FIGS. 5B-C. The charge is dischargeable to retract the pin 86 from the extended position to the retracted position. The charge may be combustible to produce a gas. The charge may be formed of a solid mixture of substances that, when ignited, react to produce the gas. For example, the charge may be formed of sodium azide ($NaNO_3$), potassium nitrate ($KNO_3$), and silicon dioxide ($SiO_2$), which react to form nitrogen gas ($N_2$).

The pyrotechnic actuator 40 is mounted to the first bracket 56. The housing 84 is fixed relative to the trim panel 34, e.g., fastened or adhered to the first bracket 56. The pyrotechnic actuator 40 fixes the grab handle 36 in the grabbable position. The grab handle 36, e.g., the first end 66 of the grab handle 36, includes a hole 88. When the grab handle 36 is in the grabbable position, the pin 86 and the hole 88 are aligned along a line parallel to the axis A. The pin 86 in the extended position extends into the hole 88, thus preventing the grab handle 36 from rotating away from the grabbable position. The pin 86 in the retracted position is spaced from the hole 88, permitting the grab handle 36 to rotate. The pyrotechnic actuator 40 is thus dischargeable to release the grab handle 36 from the grabbable position by retracting the pin 86 from the extended position to the retracted position.

The vehicle interior panel assembly 30 may include one peg 76 at the first end 66 of the bar 64, one spring 38 attached to the first bracket 56, one first stopper 80 extending from the first bracket 56, one second stopper 82 extending from the first bracket 56, and one pyrotechnic actuator 40 mounted to the first bracket 56. Alternatively, some or all of those components can be duplicated at the second end 68 of the bar 64 or the second bracket 58, e.g., reflected symmetrically about the midpoint 72 of the grab handle 36. For example, the vehicle interior panel assembly 30 can include one peg 76, one first stopper 80, one second stopper 82, one pyrotechnic actuator 40, as described above, as well as two springs 38, one fixed to the first bracket 56 and to the grab handle 36, and the other fixed to the second bracket 58 and the grab handle 36. For another example, the vehicle interior panel assembly 30 can include two pegs 76, one at the first end 66 of the bar 64 and one at the second end 68 of the bar 64; two springs 38, one fixed to the first bracket 56 and to the grab handle 36, and the other fixed to the second bracket 58 and the grab handle 36; two first stoppers 80, one extending from the first bracket 56 and one extending from the second bracket 58; two second stoppers 82, one extending from the first bracket 56 and one extending from the second bracket 58; and two pyrotechnic actuators 40, one mounted to the first bracket 56 and one mounted to the second bracket 58.

Figure 6:
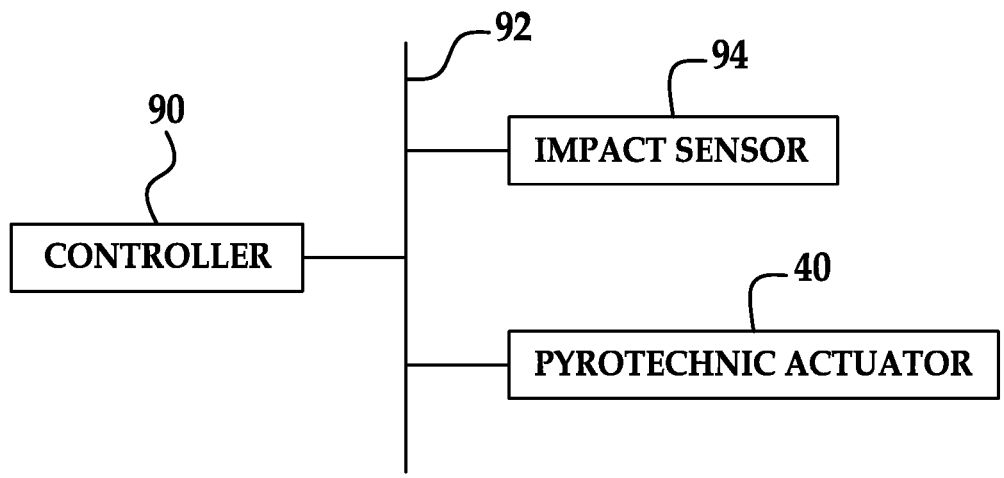
FIG. 6 is a block diagram of a control system for the vehicle interior panel assembly.

With reference to FIG. 6, the vehicle 32 includes a controller 90. The controller 90 is a microprocessor-based controller. The controller 90 includes a processor, a memory, etc. The memory of the controller 90 includes media for storing instructions executable by the processor as well as for electronically storing data and/or databases. The controller 90 may be a restraint control module and may be in communication with and may control airbags in the vehicle 32, among other functions.

The controller 90 may transmit and receive data through a communications network 92 such as a controller area network (CAN) bus, Ethernet, WiFi, Local Interconnect Network (LIN), onboard diagnostics connector (OBD-II), and/or by any other wired or wireless communications network. The controller 90 may be communicatively coupled to the pyrotechnic actuator 40, an impact sensor 94, and other components via the communications network 92.

The impact sensor 94 is adapted to detect an impact to the vehicle 32. The impact sensor 94 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 94 may be located at numerous points in or on the vehicle 32.

Figure 7:
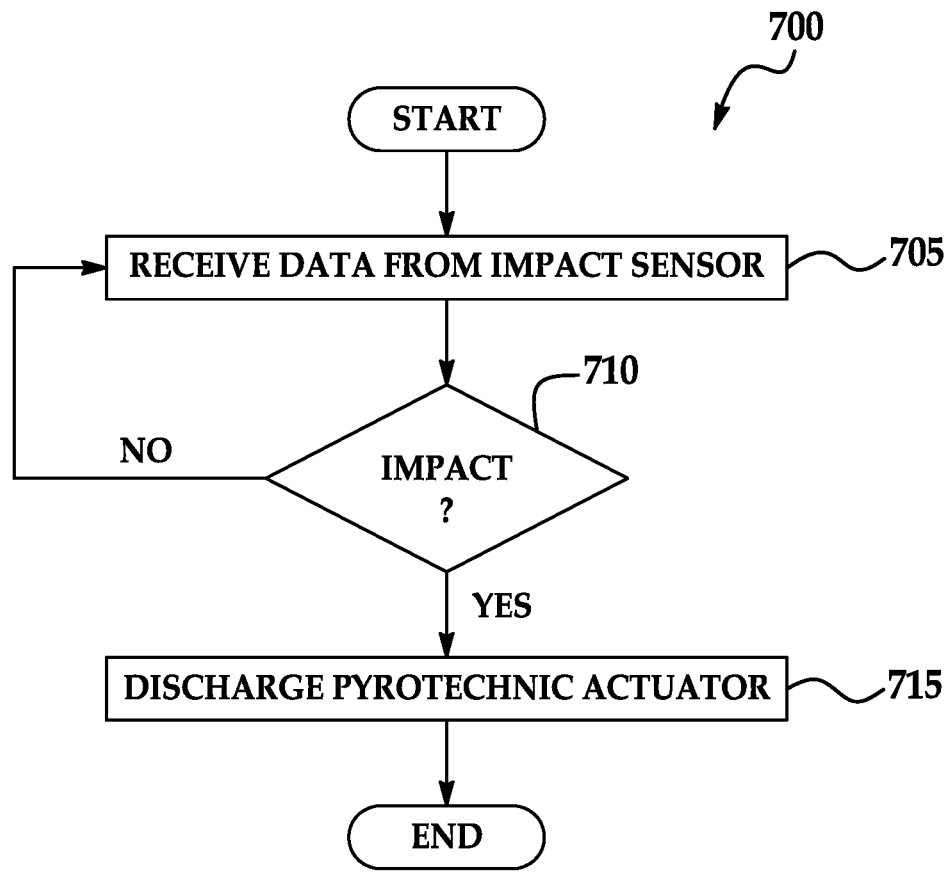
FIG. 7 is a process flow diagram of a process for discharging the pyrotechnic actuator.

FIG. 7 is a process flow diagram illustrating an exemplary process 700 for discharging the pyrotechnic actuator 40. The memory of the controller 90 stores executable instructions for performing the steps of the process 700. As a general overview of the process 700, the controller 90 is programmed to discharge the pyrotechnic actuator 40 and thus move the grab handle 36 from the grabbable position to the retracted position in response to an impact to the vehicle 32.

The process 700 begins in a block 705, in which the controller 90 receives data from the impact sensor 94 via the communications network 92. The type of data corresponds to the type of impact sensor 94; for example, the data may include angular and/or linear acceleration readings.

Next, in a decision block 710, the controller 90 determines whether the vehicle 32 is experiencing or will imminently experience an impact. For example, the controller 90 may determine whether acceleration readings from the impact sensor 94 exceed a threshold. The threshold may be chosen to indicate that an impact to the vehicle 32 has occurred. If an impact has not occurred, the process 700 returns to the block 725 to continue monitoring data from the impact sensor 94. If an impact has occurred, the process 720 proceeds to a block 715.

In the block 715, the controller 90 instructs the pyrotechnic actuator 40 to discharge. Before the pyrotechnic actuator 40 discharges, the grab handle 36 is in the grabbable position, and the pin 86 is holding the grab handle 36 in the grabbable position, as shown in FIGS. 4A and 5A. The pyrotechnic actuator 40 discharges, retracting the pin 86 at least partially into the housing 84 and away from the hole 88, as shown in FIGS. 4B and 5B. The pin 86 is no longer holding the grab handle 36 in the grabbable position. The bias of the spring 38 causes the spring 38 to rotate the grab handle 36 from the grabbable position to the retracted position, as shown in FIGS. 4C and 5C. The first stopper 80 prevents the grab handle 36 from rotating past the retracted position. Because the grab handle 36 is in the retracted position, a head of an occupant sitting in a seat nearest the grab handle 36 is less likely to impact the grab handle 36 than if the grab handle 36 were in the grabbable position.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A vehicle interior panel assembly comprising:
   a trim panel;
   a grab handle supported by the trim panel and rotatable relative to the trim panel between a retracted position and a grabbable position;
   a spring biasing the grab handle to the retracted position; and
   a pyrotechnic actuator fixing the grab handle in the grabbable position and dischargeable to release the grab handle from the grabbable position.

2. The vehicle interior panel assembly of claim 1, wherein the pyrotechnic actuator includes a pin that is retractable upon discharging the pyrotechnic actuator.

3. The vehicle interior panel assembly of claim 2, wherein the grab handle includes a hole, and the pin is retractable from an extended position in the hole to a retracted position spaced from the hole.

4. The vehicle interior panel assembly of claim 2, wherein the pyrotechnic actuator includes a housing fixed relative to the trim panel, and the pin is retractable at least partially into the housing.

5. The vehicle interior panel assembly of claim 1, further comprising a first bracket fixed relative to the trim panel, and a second bracket fixed relative to the trim panel, wherein the grab handle is coupled to the first bracket with a first revolute joint and to the second bracket with a second revolute joint.

6. The vehicle interior panel assembly of claim 5, wherein the pyrotechnic actuator is mounted to the first bracket.

7. The vehicle interior panel assembly of claim 5, wherein the spring is fixed to the first bracket and to the grab handle.

8. The vehicle interior panel assembly of claim 1, further comprising a peg fixed relative to the grab handle, and a stopper fixed relative to the trim panel, wherein the rotation of the grab handle relative to the trim panel defines a path along which the peg travels, and the stopper is positioned to interfere with the peg at a position along the path.

9. The vehicle interior panel assembly of claim 8, wherein the stopper is positioned to prevent the peg from moving in a direction against the bias of the spring when the grab handle is in the grabbable position.

10. The vehicle interior panel assembly of claim 8, wherein the stopper is positioned to prevent the peg from moving in a direction with the bias of the spring when the grab handle is in the retracted position.

11. The vehicle interior panel assembly of claim 10, wherein the stopper is a first stopper, the vehicle interior panel assembly further comprising a second stopper positioned to prevent the peg from moving in a direction against the bias of the spring when the grab handle is in the grabbable position.

12. The vehicle interior panel assembly of claim 11, wherein the first stopper and the second stopper define a range of motion of the grab handle between the grabbable position and the retracted position, and the range of motion is less than 180°.

13. The vehicle interior panel assembly of claim 1, further comprising a controller communicatively coupled to the pyrotechnic actuator and programmed to discharge the pyrotechnic actuator in response to data indicating an impact to a vehicle including the vehicle interior panel assembly.

14. The vehicle interior panel assembly of claim 1, wherein the trim panel is an A-pillar trim panel.

15. The vehicle interior panel assembly of claim 14, wherein the grab handle has a midpoint, and the midpoint when the grab handle is in the retracted position is closer to a windshield.

16. The vehicle interior panel assembly of claim 1, wherein the grab handle has a midpoint, and the midpoint when the grab handle is in the retracted position is farther outboard than the midpoint when the grab handle is in the grabbable position.

17. The vehicle interior panel assembly of claim 1, wherein the grab handle includes a bar elongated from a first end to a second end, and a foam cover encircling the bar from the first end to the second end.

18. The vehicle interior panel assembly of claim 1, wherein the spring is a torsional spring.

* * * * *